(12) United States Patent
Mortensen et al.

(10) Patent No.: US 12,543,038 B2
(45) Date of Patent: Feb. 3, 2026

(54) ATTESTATION PROCESS AND SYSTEM FOR WIRELESS SECURITY

(71) Applicant: Phoenix Technologies EMEA Ltd., Dublin (IE)

(72) Inventors: James Leonard Mortensen, Lynnwood, WA (US); Boaz Kahana, Portland, OR (US); Kenneth Charles Taylor, Kirkland, WA (US); Sanket C. Pingle, Alpharetta, GA (US)

(73) Assignee: Phoenix Technologies EMEA, Ltd., Dublin (IE)

( * ) Notice: Subject to any disclaimer, the term of this patent is extended or adjusted under 35 U.S.C. 154(b) by 270 days.

(21) Appl. No.: 18/512,457

(22) Filed: Nov. 17, 2023

(65) Prior Publication Data

US 2025/0168629 A1    May 22, 2025

(51) Int. Cl.
*H04W 12/10* (2021.01)
*H04W 12/041* (2021.01)
*H04W 12/0431* (2021.01)
*H04W 12/72* (2021.01)

(52) U.S. Cl.
CPC ..... *H04W 12/0431* (2021.01); *H04W 12/041* (2021.01); *H04W 12/10* (2013.01); *H04W 12/72* (2021.01)

(58) Field of Classification Search
CPC ........... H04W 12/0431; H04W 12/041; H04W 12/10; H04W 12/72; H04W 12/069
See application file for complete search history.

(56) References Cited

U.S. PATENT DOCUMENTS

| 7,957,533 B2 * | 6/2011 | Patel | H04L 9/3242 |
| | | | 713/168 |
| 8,296,836 B2 * | 10/2012 | Kolesnikov | H04W 12/06 |
| | | | 726/9 |

(Continued)

FOREIGN PATENT DOCUMENTS

| CN | 102150446 A | * | 8/2011 | ........... H04L 9/3213 |
| CN | 112822018 A | * | 5/2021 | ........... H04L 9/3247 |

(Continued)

OTHER PUBLICATIONS

PCT Written Opinion of the International Search Authority and International Search Report; 6 pgs., Mar. 7, 2025.

(Continued)

*Primary Examiner* — Julio R Perez
(74) *Attorney, Agent, or Firm* — Saxton & Stump, LLC

(57) ABSTRACT

A method and system for providing a secured challenge and response for wireless/mobile/IOT network security that provides a secure provisioning of mobile equipment, a challenging of the mobile equipment and the verification of the mobile equipment by a network node to verify that mobile equipment is an authentic and secure device provisioned by the operator. The challenging including sealing a shared secret operator assigned symmetric equipment key in a secure enclave and transmitting the shared secret operator assigned symmetric equipment key to a subscriber identity module for generation of a cipher key and integrity for use in verification of the mobile equipment with a network node.

24 Claims, 9 Drawing Sheets

(56) References Cited

U.S. PATENT DOCUMENTS

| | | | |
|---|---|---|---|
| 8,379,854 B2* | 2/2013 | Patel | H04W 12/04 |
| | | | 713/169 |
| 8,645,695 B2* | 2/2014 | Buckley | H04W 12/06 |
| | | | 713/172 |
| 10,958,631 B2* | 3/2021 | Fransen | H04W 12/069 |
| 11,405,190 B2* | 8/2022 | Goller | H04W 12/35 |
| 2007/0042754 A1* | 2/2007 | Bajikar | H04W 12/06 |
| | | | 455/411 |
| 2014/0219447 A1* | 8/2014 | Park | H04W 12/35 |
| | | | 380/247 |
| 2015/0341791 A1 | 11/2015 | Yang et al. | |
| 2017/0093565 A1* | 3/2017 | Yang | H04W 12/06 |
| 2019/0174313 A1* | 6/2019 | Fransen | H04W 48/08 |
| 2022/0231840 A1 | 7/2022 | Yang et al. | |
| 2022/0399993 A1 | 12/2022 | Yang et al. | |
| 2025/0168629 A1* | 5/2025 | Mortensen | H04W 12/72 |

FOREIGN PATENT DOCUMENTS

| | | | | |
|---|---|---|---|---|
| CN | 117527386 A * | 2/2024 | | H04L 63/0442 |
| EP | 4231189 A1 * | 8/2023 | | H04W 12/45 |
| WO | 2017082966 A1 | 5/2017 | | |
| WO | WO-2020148397 A1 * | 7/2020 | | H04W 12/10 |
| WO | WO-2025056431 A1 * | 3/2025 | | H04W 12/72 |

OTHER PUBLICATIONS

"5G; Security architecture and procedures for 5G System (3GPP TS 33.501 version 16.3.0 Release 16)"; ETSI TS 133 501 V16.3.0 (Aug. 2020); 251 pgs.

* cited by examiner

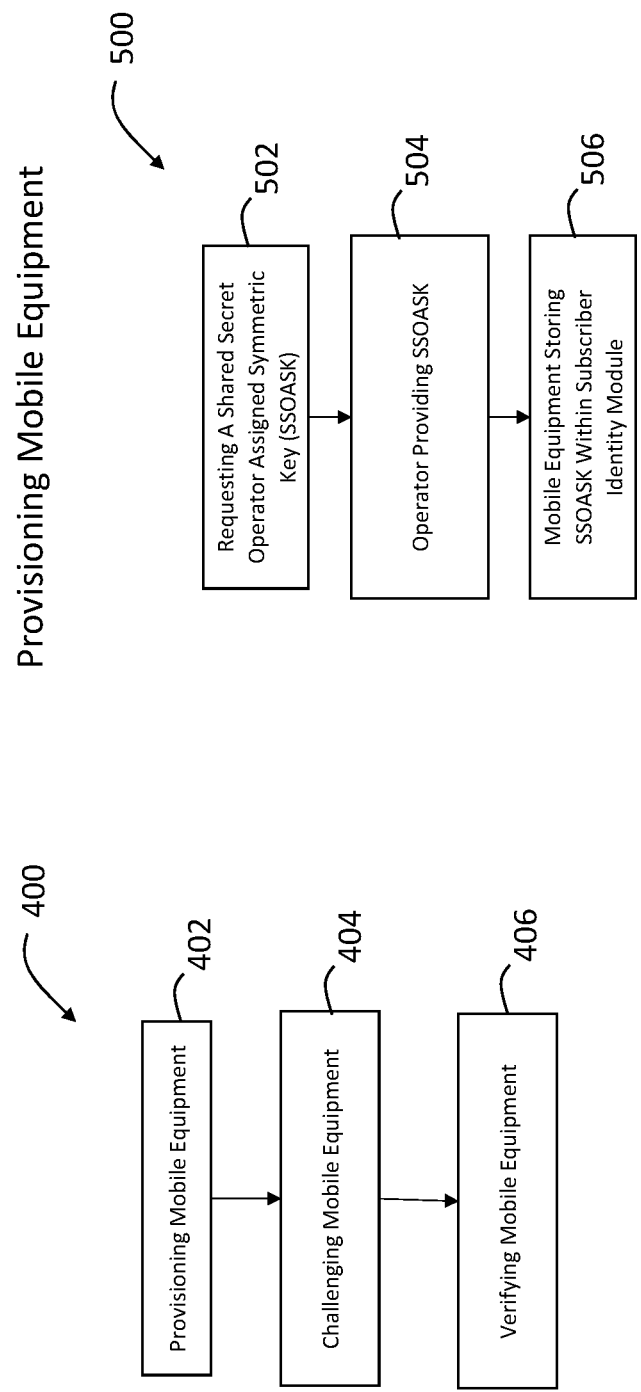

ATTESTATION PROCESS AND SYSTEM FOR WIRELESS SECURITY

FIELD OF THE INVENTION

Embodiments of the invention relate to a secured challenge and response or attestation for wireless network security.

BACKGROUND OF THE INVENTION

Even with enhanced 5G Network security, the wireless interface at the edge of the wireless network remains vulnerable to attack. Current security protocols for 5G include an Authentication Key Exchange (AKA) that provides a method to verify the connection at the edge of the network. There remain vulnerabilities in the security in the wireless connection between a mobile equipment and a network node. Current security protocols utilize the cryptographic capabilities of a universal subscriber identity module (USIM) associated with the mobile equipment to provide, for example, symmetrical encryption. The USIM stores 1) a unique and permanent subscriber identity, referred to as a Subscription Permanent Identifier (SUPI), 2) a public asymmetric key corresponding to the operator network, 3) a shared secret symmetric root key (i.e., also known as K, a shared secret between the subscriber and the corresponding operator network), and 4) a counter (i.e., Sequence Number (SQN)). The operator stores the same information within the operator network. The shared secret symmetric root key (SSSRK or K) provides a long-term shared secret that provides an ability for the operator to verify the identity of the subscriber and SQN provides replay protection for the subscriber. The network node is securely connected to the operator network, but the connection between the mobile equipment and the network node at the edge of the network is less secure and requires specific authentication techniques.

The network node and the mobile equipment, perform the AKA to provide the authentication. In the typical, known, 5G protocol, to authenticate a mobile equipment, the mobile equipment wirelessly requests authentication from the network node. In response to the mobile equipment requesting authentication, the operator network, upon receiving the request from the network node, computes an authentication challenge that includes a nonce and Authentication Token (AUTN). Upon receipt of the nonce and AUTN, the USIM corresponding to the mobile equipment verifies the freshness of the authentication challenge and verifies the AUTN. If the AUTN is determined to be authentic, USIM computes a response. Specifically, the mobile equipment, using the USIM, sends an authentication response including a Subscriber concealed identifier (SUCI) that is calculated from SUPI using the public asymmetric key corresponding to the operator network. The network node receives the SUCI, and the operator network decrypts the SUCI using the private asymmetric key that corresponds to the public key corresponding the operator network and verifies that the SUPI matches the SUPI of the subscriber. If the decrypted SUCI yields a matching SUPI, the home network further communicates with the mobile equipment through the network node.

The wireless connection between the mobile equipment and the network node is subject to attack by passive or active attackers. For example, passive attackers may eavesdrop on the information exchanged between the mobile equipment and network node. Active attackers may perform manipulation, interception and/or injection of malicious code into transmitted information. That is, passive attackers listen to signaling messages between the mobile equipment and the network node and can eavesdrop on all information exchanged. Active attackers may, for example, may send and receive signaling messages, for example, to impersonate network nodes. Passive or active attacks may include, for example, denial of service (DDoS) attacks, false cell phone tower or stingray attacks, and/or man in the middle (MiTM) attacks.

A DDoS attack is an attack by an active attacker where network resources are purposefully made unavailable to users. In one of these types of attacks, malicious mobile equipment may cause a signaling storm by flooding the network with requests that render the network unavailable to subscribers. Such an attack reduces the ability of the network to provide legitimate data exchange to legitimate user mobile equipment.

Additional examples of attacks include a false cell tower attack and a stingray attack. False cell tower attacks are a type of attack that utilize a device that can alter the mobile equipment registration process, thus spoofing the identity of a legitimate network node to change or divert data traffic flows or provide other disruptive activities. For example, the false cell tower can force mobile equipment in a particular area to connect to the false cell tower, so that the mobile equipment location and/or data may be obtained by the attacker. These types of attacks are typically designed to steal user identity and/or steal user credentials. A stingray attack includes aspects of a false tower attack and may include the injection of malicious code (virus, Trojans, etc.) onto the mobile equipment or at the network node, which may result in compromised information integrity and asset destruction. For example, subscriber data, system integrity information, user financial data, and geo location can be stolen and or manipulated.

In an eavesdropping or MiTM attack, a device intercepts wireless data being transmitted between the mobile equipment and the network node. The data that may be intercepted may include data packages, short message service (SMS) data, voice data or other data being sent from the mobile equipment or from the network node. This type of attack is commonly utilized by threat actors attempting to access sensitive information, such as for the purposes of espionage.

The current authentication methods for verifying the connection between the mobile equipment and the network node utilize primarily the USIM corresponding to the mobile equipment to complete the Authentication Key Exchange (AKA). However, the AKA is not sufficient to provide security and utilization of the current AKA provides a vulnerability to the wireless network.

What is needed is a method and system that provides an additional layer or security to reliably verify mobile equipment during the secured challenge and response with the networks nodes to reduce or eliminate attacks on the wireless networks. Other features and advantages will be made apparent from the present specification. The teachings disclosed extend to those embodiments that fall within the scope of the claims, regardless of whether they accomplish one or more of the aforementioned needs.

SUMMARY OF THE INVENTION

The present disclosure includes a method and system for providing a secured challenge and response for wireless/mobile/IOT network security that provides a secure provisioning of mobile equipment, a challenging of the mobile equipment and the verification of the mobile equipment by a network node to verify that mobile equipment is an authentic and secure device provisioned by the operator.

An embodiment of the present disclosure includes a non-transitory machine-readable storage medium storing one or more sequences of instructions a secured challenge and response for wireless network security, which when executed by one or more processors, cause provisioning of mobile equipment with an operator. A shared secret operator assigned symmetric equipment key is requested with a subscriber identity module associated with the mobile equipment. The shared secret operator assigned symmetric equipment key is provided from the operator and is stored within the subscriber identity module. The subscriber identity module then challenges the mobile equipment. The challenging includes generating an asymmetric key pair including an asymmetric encryption key and an asymmetric decryption key. The shared secret operator assigned symmetric equipment key and asymmetric encryption key are provided to a secure enclave. The shared secret operator assigned symmetric equipment key and the asymmetric encryption key are sealed into the secure enclave. A nonce is generated with the subscriber identity module and is transmitted to the secure enclave. The shared secret operator assigned symmetric equipment key and the nonce are encrypted with the asymmetric encryption key in the secure enclave to form a verification encryption package. The verification encryption package is transmitted to the subscriber identity module. The verification encryption package is decrypted with the asymmetric decryption key to release the shared secret operator assigned symmetric equipment key. The shared secret operator assigned symmetric equipment key is stored in the subscriber identity module. A cipher key and an integrity key are generated with the subscriber identity module from the shared secret operator assigned symmetric equipment key. The cipher key and an integrity key are stored in the subscriber identity module.

Another embodiment of the present disclosure includes a computer system configured to provide a secured challenge and response for wireless network security. The computer system includes a mobile equipment having one or more processors. The mobile equipment includes one or more computer-readable storage mediums storing one or more sequences of instructions, which when executed, cause a mobile equipment to provision the mobile equipment with an operator. The provisioning includes requesting, with a subscriber identity module associated with the mobile equipment, a shared secret operator assigned symmetric equipment key. The shared secret operator assigned symmetric equipment key is provided from the operator and stored within the subscriber identity module. The one or more sequences of instructions cause the subscriber identity module to challenge the mobile equipment. The challenging includes generating an asymmetric key pair including an asymmetric encryption key and an asymmetric decryption key. The shared secret operator assigned symmetric equipment key and the asymmetric encryption key is provided to a secure enclave. The shared secret operator assigned symmetric equipment key and the asymmetric encryption key are sealed into the secure enclave. A nonce is generated with the subscriber identity module and is transmitted to the secure enclave. The shared secret operator assigned symmetric equipment key and the nonce are encrypted with the asymmetric encryption key in the secure enclave to form a verification encryption package. The verification encryption package is transmitted to the subscriber identity module. The verification encryption package is decrypted with the asymmetric decryption key to release the shared secret operator assigned symmetric equipment key. The shared secret operator assigned symmetric equipment key is stored in the subscriber identity module. A cipher key and an integrity key are generated with the subscriber identity module from the shared secret operator assigned symmetric equipment key and is stored in the subscriber identity module.

Another embodiment of the present disclosure includes a method for providing a secured challenge and response for wireless/mobile/IOT network security. The method includes provisioning a mobile equipment with an operator. The provisioning includes requesting, with a subscriber identity module associated with the mobile equipment, a shared secret operator assigned symmetric equipment key and providing, from the operator, the shared secret operator assigned symmetric equipment key, and storing the shared secret operator assigned symmetric equipment key within the subscriber identity module. The mobile equipment is challenged with the subscriber identity module. The challenging includes generating an asymmetric key pair including an asymmetric encryption key and an asymmetric decryption key. The shared secret operator assigned symmetric equipment key and the asymmetric encryption key are provided to a secure enclave. The shared secret operator assigned symmetric equipment key and the asymmetric encryption key are sealed into the secure enclave. A nonce is generated with the subscriber identity module and is transmitted to the secure enclave. The shared secret operator assigned symmetric equipment key and the nonce are encrypted with the asymmetric encryption key in the secure enclave to form a verification encryption package. The verification encryption package is transmitted to the subscriber identity module. The verification encryption package is decrypted with the asymmetric decryption key to release the shared secret operator assigned symmetric equipment key. The shared secret operator assigned symmetric equipment key is stored in the subscriber identity module. A cipher key and an integrity key are generated with the subscriber identity module from the shared secret operator assigned symmetric equipment key and are stored in the subscriber identity module.

Other features and advantages of the present invention will be apparent from the following more detailed description of the preferred embodiment, taken in conjunction with the accompanying drawings which illustrate, by way of example, the principles of the invention.

BRIEF DESCRIPTION OF DRAWINGS

Embodiments of the invention are illustrated by way of example, and not by way of limitation, in the figures of the accompanying drawings and in which like reference numerals refer to similar elements and in which:

FIG. 4 is a flowchart describing the high-level steps of authenticating mobile equipment according to embodiments of the disclosure.

FIG. 5 is a flowchart describing the steps of provisioning the mobile equipment according to embodiments of the disclosure.

Wherever possible, the same reference numbers will be used throughout the drawings to represent the same parts.

DETAILED DESCRIPTION OF THE INVENTION

Figure 1:
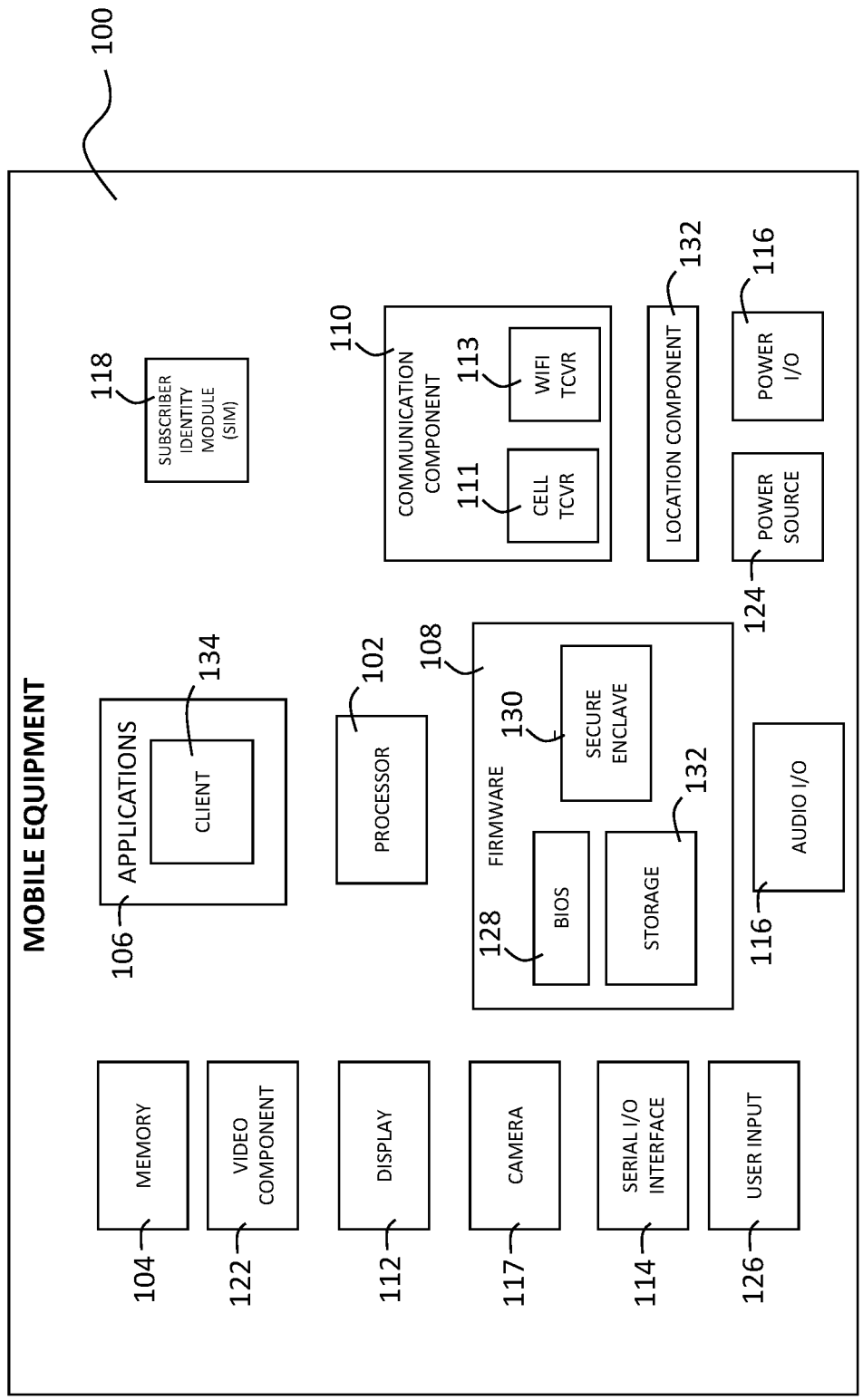
FIG. 1 is a block diagram of the functional components of an illustrative mobile equipment according to an embodiment of the disclosure.

The present disclosure includes a secured challenge and response wireless network security or attestation to authenticate mobile equipment for secure communication to network nodes. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

The method and system according to the present disclosure addresses common attacks by introducing a novel attestation method that verifies mobile equipment as being associated with the user/subscriber for secure communication. Embodiments of the present disclosure include a method and system wherein mobile equipment (ME) and a network node (e.g., gNb (5G RAN)) perform a certificate authority (CA) public certificate exchange utilizing a cipher key and integrity key that have been generated and stored in the subscriber identity module of the mobile equipment. The method and system according to the present disclosure is OEM agnostic on both the mobile equipment and the network, thus allowing deployment in domestic and roaming scenarios. The method and system according to the present disclosure secures the edge of the wireless network due to the additional utilization of a shared secret operator assigned symmetric equipment key in the cryptographic exchange. In addition, the method and system according to the present disclosure provides enhanced security during inter- and intra-network handovers supporting mobility. Further, the enhanced security provided by the utilization of a shared secret operator assigned symmetric equipment key reduces or eliminates the ability for firmware of mobile equipment to be compromised. Security is enhanced over prior art systems by the securing of the shared secret operator assigned symmetric equipment key from sharing or manipulation, where a nonce is required to release the shared secret operator assigned symmetric equipment key to the SIM for storage and/or use in verification.

Certain embodiments of the invention advantageously provide the user of a mobile equipment with the peace of mind knowing that the mobile equipment cannot execute an operating system if the mobile equipment has been compromised in some fashion. As shall be explained in detail below, embodiments of the invention may employ a secure enclave, locally residing on a mobile equipment, which may be used to attest the resources of a mobile equipment. If the secure enclave judges the mobile equipment to not be associated with the user/subscriber or having been compromised (as might be the case if malicious code is installed on the mobile equipment), then the mobile equipment may be prevented from communicating with a network node, providing network security.

FIG. 1 shows a block diagram of the functional components of an illustrative mobile equipment 100 according to an embodiment of the disclosure. Mobile equipment 101 may be any mobile device capable of connecting to a network in accordance with some embodiments described herein. Although mobile equipment 100 may be a handset, as illustrated herein, it will be understood that other devices can be any mobile device, and that the mobile equipment 100 is merely illustrated to provide context for the embodiments of the various embodiments described herein. For example, the mobile equipment 100 can be a device such as a cellular telephone, a PDA with mobile communications capabilities, a vehicle, a laptop, a tablet, smart watch, internet of things (IOT) devices, other smart devices and other mobile devices having wireless communication abilities. The following discussion is intended to provide a brief, general description of an example of a suitable environment in which the various embodiments can be implemented. While the description comprises a general context of computer-executable instructions embodied on a machine-readable storage medium, those skilled in the art will recognize that the innovation also can be implemented in combination with other program modules and/or as a combination of hardware and software.

The mobile equipment 100 may utilize any suitable applications (e.g., program modules/clients), which may include routines, programs, components, data structures, etc., that perform particular tasks or implement particular abstract data types. Moreover, those skilled in the art will appreciate that the methods described herein can be practiced with other system configurations, comprising single-processor or multiprocessor systems, microprocessor-based or programmable consumer electronics, and the like, each of which can be operatively coupled to one or more associated devices.

The mobile equipment 100 may include any suitable machine-readable media. Machine-readable media can be any available media that can be accessed by the computer and comprises both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information, and which can be accessed by the computer.

The mobile equipment 100 may communicate utilizing communication media that is transmitted via wired or wireless connections. Suitable communication media may include computer-readable instructions, data structures, program modules or other data in a modulated data signal such as a carrier wave or other transport mechanism and comprises any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared and other wireless media. Combinations of the any of the above should also be included within the scope of computer-readable media.

As shown in FIG. 1, mobile equipment 100 comprises a processor 102 for controlling and processing all onboard operations and functions. A memory 104 and firmware 108 are machine-readable media and interfaces to the processor 102 for storage of data and one or more applications 106. The applications 106 can be stored in the memory 104 and/or in a firmware 108 and executed by the processor 102 from either or both the memory 104 or/and the firmware 108. The firmware 108 can also store startup code for execution in initializing the mobile equipment 100. A communications component 110 for transmitting communication media interfaces to the processor 102 to facilitate wired/wireless communication with external systems, e.g., cellular networks, VoIP networks, and so on. Here, the communications component 110 can also include a suitable cellular transceiver 111 (e.g., a GSM transceiver) and/or an unlicensed transceiver 913 (e.g., Wi-Fi, WiMax) for corresponding signal communications. Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices. The communications component 110 may also facilitate communications from terrestrial radio networks (e.g., broadcast), digital satellite radio networks, and Internet-based radio services networks.

The mobile equipment 100 comprises a display 112 for displaying text, images, video, telephony functions, setup functions, and for user input. For example, the display 112 can also be referred to as a "screen" that can accommodate the presentation of multimedia content (e.g., music metadata, messages, wallpaper, graphics, etc.). The display 112 can also display videos and can facilitate the generation, editing and sharing of video quotes. A serial I/O interface 114 is provided in communication with the processor 102 to facilitate wired and/or wireless serial communications (e.g., USB, and/or IEEE 1394) through a hardwire connection, and other serial input devices (e.g., a keyboard, keypad, and mouse). This supports updating and troubleshooting the mobile equipment 100, for example. Audio capabilities are provided with an audio i/O component 116, which can include a speaker for the output of audio signals related to, for example, indication that the user pressed the proper key or key combination to initiate the user feedback signal. The audio I/O component 116 also facilitates the input of audio signals through a microphone to record data and/or telephony voice data, and for inputting voice signals for telephone conversations. Mobile equipment 100 may also include a camera 117 that interfaces with processor 102 and provides image or video data. While these components are shown in FIG. 1 one or more of these components may be optionally omitted in mobile equipment 100.

The mobile equipment 100 may include an interface or other physical subscriber identity module 118 interfacing with processor 102. The subscriber identify module 118 may include a slot interface for accommodating a SIC (Subscriber Identity Component) in the form, for example, of a card Subscriber Identity Module (SIM) or universal SIM 118, or interface providing a virtual or remote subscriber identity module 118 to interface with the processor 102. However, it is to be appreciated that subscriber identity module 118 can be manufactured into the mobile equipment 100 and updated by downloading data and software. SIM 118 includes a hardware or software device that contains code, such as an applet, that implements a security module that support the cryptographic security steps according to methods according to the present disclosure. In one embodiment, SIM 118 has a pre-installed security applet for Authentication messaging. In addition, SIM 118 is capable of utilizing application protocol data unit (APDU) commands along with subscriber identity module application toolkit (SAT) for communication with the mobile equipment OS. In addition, SIM 118 may include or may be provided with a shared secret symmetric root key (K) from the operator, which corresponds to network-specific information used to authenticate and identify subscribers on the network. K may be stored in SIM 118 and may be utilized to provide cryptographic security that identifies and authenticates subscribers on mobile networks. K may be provided to SIM 118, such as over the air (OTA) from the operator, or may be programmed and/or stored in SIM 118 at manufacture or creation of SIM 118. The shared secret symmetric root key (K) includes the "K" or "$K_i$" currently known for use in network security for mobile devices, which may include 128-bit values used for authenticating SIMs on mobile networks.

The mobile equipment 100 can process communication media including IP data traffic through the communication component 110 to accommodate IP traffic from an IP network such as, for example, the Internet, a corporate intranet, a home network, a person area network, etc., through an ISP or broadband cable provider. Thus, VoIP traffic can be utilized by the mobile equipment 100 and IP-based multimedia content can be received in either an encoded or decoded format.

The mobile equipment 100 also comprises a power source 124 in the form of batteries and/or an AC power subsystem, which power source 124 can interface to an external power system or charging equipment (not shown) by a power I/O component 126.

The mobile equipment 100 can also include a video component 122 for processing video content received and, for recording and transmitting video content. For example, the video component 122 can facilitate the generation, editing and sharing of video quotes. A location tracking component 132 facilitates geographically locating the mobile equipment 100. As described hereinabove, this can occur when the user initiates the feedback signal automatically or manually. A user input component 126 facilitates a mechanism to permit the user to interact with the mobile equipment 100. The user input component 126 can include such conventional input device technologies such as a keypad, keyboard, mouse, stylus pen, and/or touch screen, for example.

The mobile equipment 100, as indicated above relates to the communications component 110, comprises an indoor network radio transceiver 113 (e.g., Wi-Fi transceiver). This function supports the indoor radio link, such as IEEE 802.11, for the dual-mode GSM mobile equipment 100. The mobile equipment 100 can accommodate at least satellite radio services through a mobile equipment that can combine wireless voice and digital radio chipsets into a single handheld device.

Referring again to FIG. 1, firmware 108 includes basic input/output system BIOS 128, secure enclave 130 and storage 132. BIOS 128, as broadly used herein, refers to any basic input/output system (BIOS) that is designed to be the boot firmware for mobile equipment 100 when mobile equipment 100 is powered on. BIOS code may execute prior to the initialization of an operating system (OS) of the information handling system. In an embodiment, BIOS 128 includes or corresponds to Unified Extensible Firmware Interface (UEFI) Platform Firmware. A Unified Extensible Firmware Interface (UEFI) standard has been developed by the Unified EFI Forum industry group to enhance the booting process of modern computer systems.

Secure enclave 130, as broadly used herein, refers to any hardware mechanism which provides an environment allowing code executing therein to have full access to resources of the computer system in which the secure enclave resides, and yet resources of the computer system external to the secure enclave have no ability to read or write to resources maintained inside the secure enclave. Non-limiting, illustrative examples of secure enclave 130 include the Innovation Engine (IE) available from Intel Corporation of Santa Clara, Calif., and the ARM-based Platform Security Processor (PSP) available from AMD Inc. of Santa Clara, Calif. Secure enclave 130 may enable messages to be exchanged between processes executing outside of secure enclave 132 with processes executing inside of secure enclave 130. In addition, the secure enclave 130 according to the present disclosure may include software, such as x86 SMM and Arm TrustZone. Another example of a suitable secure enclave 130 may include a Trusted Platform Module (TPM).

Storage 132, as broadly used herein, refers to any machine-readable media for storing digital data. Non-limiting, illustrative examples of storage 132 include a hard-disk drive (HDD) and solid-state memory, such as a flash drive.

Applications 106 may include a number of program modules that may be stored in the memory 104 or firmware 108 of the mobile equipment. Applications may include one or more clients 134 which may include an operating system, one or more application programs, other program modules and/or program data.

Figure 2:
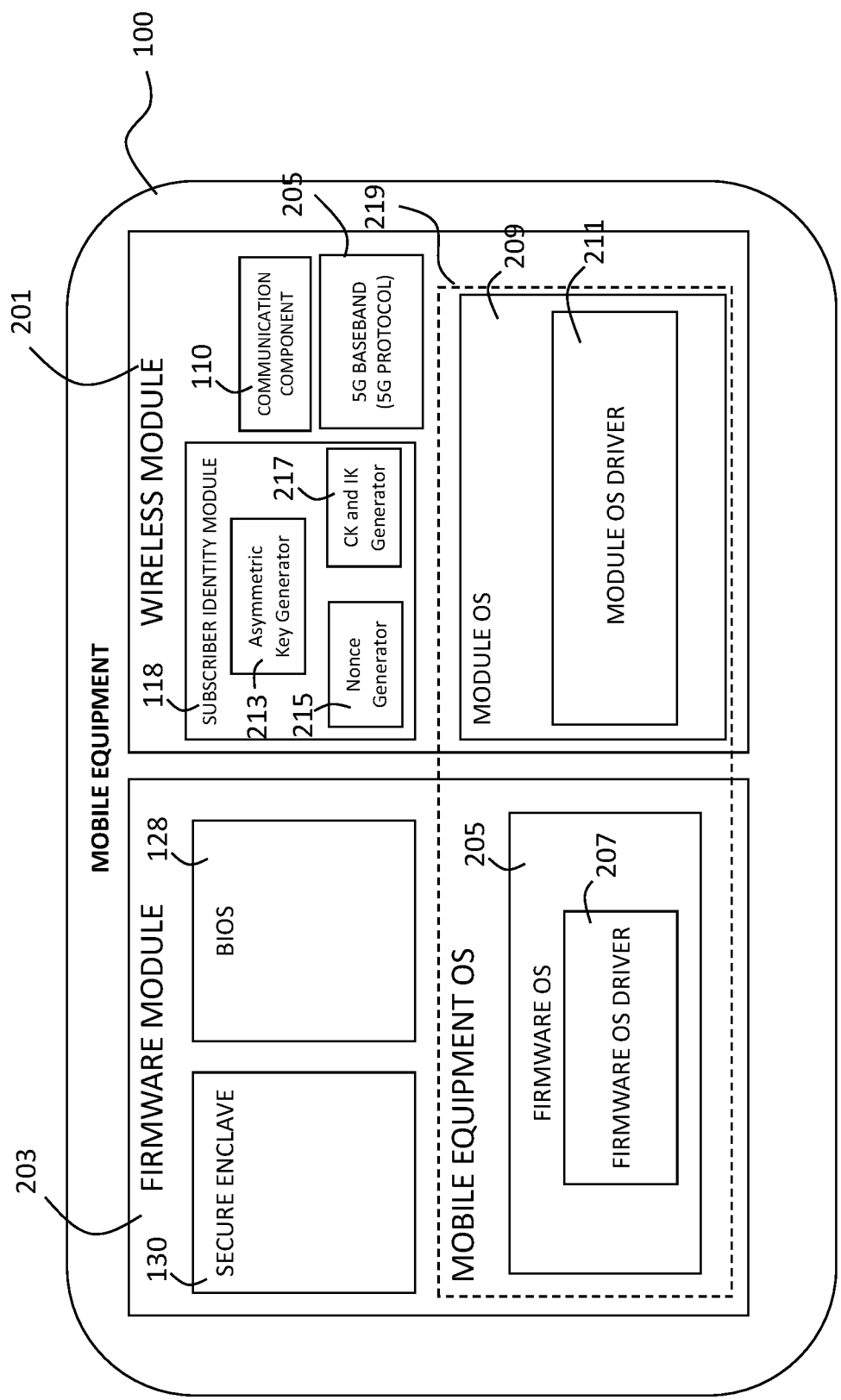
FIG. 2 is a block diagram of the operating components of an illustrative mobile equipment according to an embodiment of the disclosure.

FIG. 2 shows a block diagram of the operating elements of an illustrative mobile equipment 100 according to an embodiment of the disclosure. FIG. 2 shows a simplified diagram of the elements that provide the operation of the mobile equipment 100 to perform the method according to the present disclosure. As shown in FIG. 2, the mobile equipment 100 includes a wireless module 201 and a firmware module 203. Firmware module 203 includes elements of firmware 108 from FIG. 1, including secure enclave 130 and BIOS 128. In addition, firmware module includes a firmware operating system 205, which includes a firmware operating system driver 207. Firmware operating system driver 207 is a client 134 that provides control and communication within firmware 108. In particular, firmware operating system driver 207 includes the ability to provide information, including cryptographic keys to the secure enclave 130 through BIOS 128. Module OS 209 through instructions or code provided by module OS driver 211 provide control and communication within components of the mobile equipment 100. Both the firmware operating system 205 and the module operating system 211 together are included in mobile equipment operating system 219. The firmware operating system driver 207 and the module operating system driver 209 function to provide control and communication to mobile equipment 100, while maintaining separate elements, such as hardware and accessibility.

Wireless module 201 includes communication component 110 and subscriber identification module 118 or SIM, as well as 5G Baseband 205. 5G Baseband, as utilized herein, includes equipment which handles radio communications and radio control processing functions. The function of 5G Baseband includes processing 5G protocol messages between the mobile equipment 100 and network nodes and/or their corresponding networks using air interfaces, such as radio frequency (RF) links.

The subscriber identity module 118 includes code or instructions that provide communication to the various components of the mobile equipment 100, to components external to the mobile equipment 100 and is capable of generating cryptographic features for provisioning, challenging and verifying mobile equipment 100. While not so limited, subscriber identity module 118, as shown in FIG. 2, includes a number of cryptographic feature generating components, including an asymmetric key generator 213, a nonce generator 215 and a cipher key (CK) and integrity key (IK) generator 217. The asymmetric key generator 213 is code or instructions that, when executed by processor 102, generates an asymmetric key pair, including an asymmetric decryption key and an asymmetric encryption key. The nonce generator 215 is code or instructions, when executed by processor 102, generates a nonce. "Nonce" as utilized herein is intended to be interpreted according to its understood meaning in the art and includes an arbitrary number that is used only once in a cryptographic operation. The CK and IK generator 217 is code or instructions, when executed by processor 102, generates a cipher key and an integrity key. "Cipher key" and "integrity key", as utilized herein, is intended to be interpreted according to its understood meaning in the art and includes a cipher key (CK) and integrity key (IK) that are derived keys based on agreed upon Key Derivation Function (KDF) by the network provider. The cipher key (CK) and integrity key (IK) generated according to the present disclosure may be 128 bit values and are derived from a shared secret symmetric root key (K) and a shared secret operator assigned symmetric equipment key (K2). The cipher key (CK) and integrity key (IK) indicate the type of encryption used for messaging and validity of the message. Each of the asymmetric key generator 213, the nonce generator 215 and the cipher key (CK) and integrity key (IK) generator 217 utilize known security algorithms to generate, encrypt or decrypt the cryptographic keys. For example, security algorithms, such as SNOW or Advance Encryption Standard (AES) algorithm standards may be utilized to generate the cryptographic keys. One particularly suitable example for an encryption for use with the method and system according to the present disclosure includes Secure Hash Algorithm-256 (SHA-256). Subscriber identity module 118 may include one or more applets stored in read only memory (ROM) within the subscriber identity module 118 that provide the ability to generate, save and/or communicate information. For example, the applet may provide the ability to receive a cryptographic key and transmit the cryptographic key elsewhere in the mobile equipment 100. In addition, the applet may provide the ability to generate cryptographic keys, such as cipher keys and integrity keys. In addition, the cipher key (CK) and integrity key (IK) generator 217, which may be, for example, an applet in SIM 118, may include code or instructions to cryptographically derive the cipher key (CK) and integrity key (IK) with shared secret symmetric root key (K) and the shared secret operator assigned symmetric equipment key (K2) and store the cipher key (CK) and integrity key (IK) in SIM 118.

Figure 3:
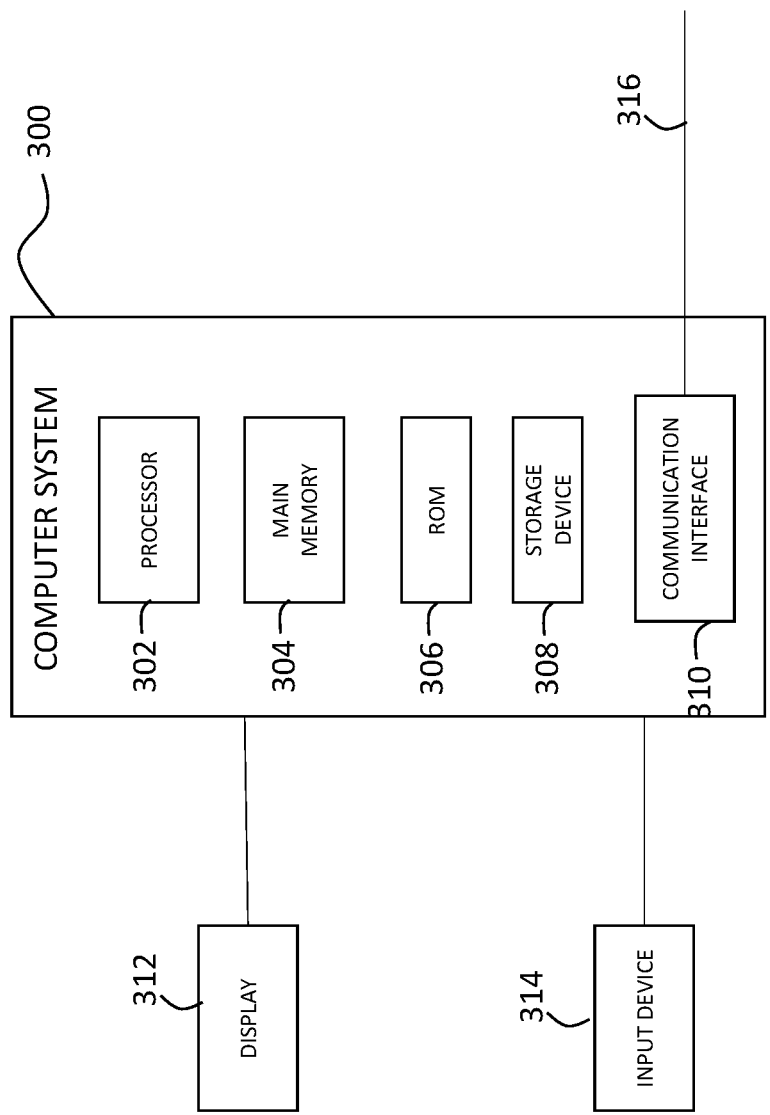
FIG. 3 is a block diagram of the operating components of an illustrative computer system according to an embodiment of the disclosure.

FIG. 3 is a block diagram that illustrates a computer system 300 upon which an embodiment of the invention may be implemented. Specifically, computer system 300 may be utilized in one or more network nodes 1302. For example, a network node (e.g., network node 1302 (see for example, FIGS. 8, 10, 11 and 12)) can contain components as described in FIG. 3. The computer 300 can provide networking and communication capabilities between a wired or wireless communication network and a server and/or communication device. In order to provide additional context for various aspects thereof, FIG. 3 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Computer system 300 may include the same suitable applications, machine-readable media and communication media as described above for mobile equipment 100.

In one embodiment, as shown in FIG. 3, computer system 300 includes processor 302, main memory 304, ROM 306, storage device 308, and communication interface 310. These components may be the same or different than the components described above with respect to mobile equipment 100.

Computer system 300 includes at least one processor 302 for processing information. Computer system 300 includes a main memory 304, such as a random access memory (RAM) or other dynamic storage device, for storing information and instructions to be executed by processor 302. Main memory 304 also may be used for storing temporary variables or other intermediate information during execution of instructions to be executed by processor 302. Computer system 300 further includes a read only memory (ROM) 306 or other static storage device for storing static information and instructions for processor 302. A storage device 308, such as a magnetic disk or optical disk, is provided for storing information and instructions.

Computer system 300 may be coupled to a display 312, such as, but not limited to, a light emitting diode (LED) monitor, organic light emitting diode (OLED) monitor, an LCD monitor, a cathode ray tube (CRT), or other monitor or screen known for displaying information to a user. An input device 314, such as a keyboard, mouse, touch screen or other known input device is coupled to computer system 300 for communicating information and command selections to processor 302. Other non-limiting, illustrative examples of input device 314 include any device for communicating direction information and command selections to processor 302 and for controlling cursor movement on display 312. While only one input device 314 is depicted in FIG. 3, embodiments of the invention may include any number of input devices 314 coupled to computer system 300.

Embodiments of the invention are related to the use of computer system 300 for implementing the techniques described herein. According to one embodiment of the invention, those techniques are performed by computer system 300 in response to processor 302 executing one or more sequences of one or more instructions contained in main memory 304. Such instructions may be read into main memory 304 from another machine-readable medium, such as storage device 308. Execution of the sequences of instructions contained in main memory 304 causes processor 302 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any medium that participates in storing instructions which may be provided to processor 302 for execution. Such a medium may take many forms, including but not limited to, non-volatile media and volatile media. Non-volatile media includes, for example, optical or magnetic disks, such as storage device 308. Volatile media includes dynamic memory, such as main memory 304.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine-readable media may be involved in carrying one or more sequences of one or more instructions to processor 302 for execution. For example, the instructions may initially be carried on a magnetic disk of a remote computer. The remote computer can load the instructions into its dynamic memory and send the instructions over a network link 316 to computer system 300.

Communication interface 310 provides a two-way data communication of communication media by coupling to a network link 318 that is connected to a local network. For example, communication interface 316 may be an integrated services digital network (ISDN) card or a modem to provide a data communication connection to a corresponding type of communication line. As another example, communication interface 310 may be a local area network (LAN) card to provide a data communication connection to a compatible LAN. Wireless links, such as but not limited to a Bluetooth and/or 3G/4G connection, may also be implemented. In any such implementation, communication interface 310 sends and receives electrical, electromagnetic or optical signals that carry digital data streams representing various types of information. Network link 316 typically provides data communication through one or more networks to other data devices. For example, network link 316 may provide a connection through a local network to a host computer or to data equipment operated by an Internet Service Provider (ISP).

Computer system 300 can send messages and receive data, including program code, through the network(s), network link 316 and communication interface 310. For example, a server might transmit a requested code for an application program through the Internet, a local ISP, a local network, subsequently to communication interface 310. The received code may be executed by processor 302 as it is received, and/or stored in storage device 308, or other non-volatile storage for later execution.

As shown in FIG. 4, method 400 according to the present disclosure includes a process for wireless/mobile/IOT network security, where method 400 includes provisioning mobile equipment 100 (step 402), challenging mobile equipment 100 (step 404) and verifying mobile equipment 100 (step 406).

FIG. 5 shows details of step 402 of method 400, where method 500 includes provisioning mobile equipment 100. A shared secret operator assigned symmetric equipment key (SSOASK) is requested by subscriber identity module 118 of the mobile equipment 100 from an operator (step 502). In response, the operator provides the SSOASK to challenge and verify the mobile equipment 100 (step 504). The remote providing of the SSOASK may be accomplished from a request from SIM 118, using pilot data from the operator, for the SSOASK or K2 specific to the mobile equipment 100. In response to the request, operator sends a silent short message service (over the air) (SMS(OTA)) to mobile equipment 100, which, via baseband, is sent to SIM 118 for initial storage. Operator, as utilized herein are any public or private wireless service providers, such as 5G service providers. Once received from the operator, the mobile equipment 100 stores the SSOASK within the subscriber identity module 118 (step 506). Additionally, the subscriber identity module 118 may further acknowledge receipt of the SSOASK and may authenticate that the subscriber identity module 118 is the subscriber identity module 118 that sent the request for the SSOASK to the operator.

Figure 6:
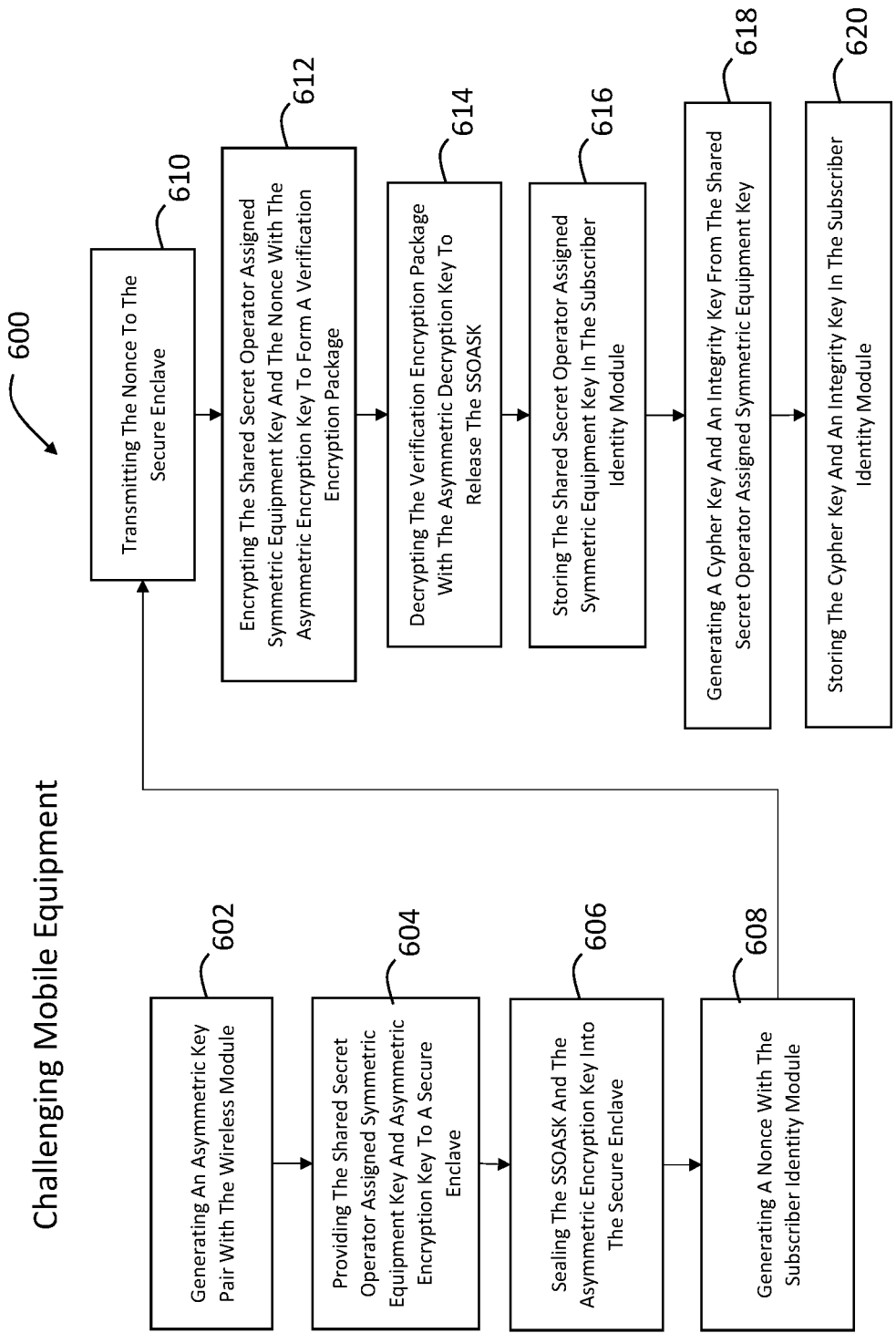
FIG. 6 is a flowchart describing the steps of challenging the mobile equipment according to embodiments of the disclosure.

FIG. 6 shows details of step 404 of method 400, wherein method 600 includes challenging the mobile equipment 100 after the mobile equipment 100 is provisioned according to method 500. The challenging includes generating an asymmetric key pair including an asymmetric encryption key and an asymmetric decryption key (step 602). The asymmetric key pair includes an asymmetric encryption key and an asymmetric decryption key, the asymmetric key pair may also be an asymmetric public/private key pair. The shared secret operator assigned symmetric equipment key and the asymmetric encryption key are provided to a secure enclave (step 604). In one embodiment, the shared secret operator assigned symmetric equipment key is removed from the memory of the subscriber identity module 118 after the shared secret operator assigned symmetric equipment key is transmitted to the secured enclave. The shared secret operator assigned symmetric equipment key and the asymmetric encryption key are sealed into the secure enclave (step 606). By "sealing", as utilized herein, the information, such as the SSOASK and the symmetric encryption key, is saved in a manner that only software executing within secure enclave 130 may access the information, thereby providing the privacy and integrity of the information from processes outside of the secure enclave. This "secret", for example the shared secret operator assigned symmetric equipment key, is sealed against a specific state of the system, as measured during the firmware boot process. The secret can only be unsealed if the system is in the same specific state that the secret was sealed against. In this way, if the state of the firmware has changed, which could indicate corruption or injection of malware into the firmware, the state of the system will be different and therefore the secret cannot be unsealed and will remain sealed with the secure enclave. In another embodiment, the information may be stored in another secure location that provides the same privacy and integrity of the SSOASK and the symmetric encryption key, such as a Trusted Platform Module (TPM). This portion of the challenging method 600 may take place while the mobile equipment 100 is performing a measured boot. That is, during the measured boot phase of the startup of the mobile equipment 100, the SSOASK is provided to secured enclave and is sealed. A "measured boot" is a known process within computer systems, wherein the system typically executes firmware that performs a boot process to initialize various system components and interfaces, load an operating system, and perform various other actions to configure the system into a known and initial state. Basic input/output system (BIOS) or unified extensible firmware interface (UEFI) specifications may be utilized to oversee these processes. For example, a UEFI-compliant boot process may measure each portion of the code to obtain a signature specific to that code throughout the boot process. Each signature is cryptographically combined to generate a final signature that represents the specific boot code for the system. Each signature is cryptographically combined to generate a final signature that represents the specific boot code for the system. The SSOASK is cryptographically sealed against the final signature to prevent access if the system did not boot the same code. A difference in measurements across boots could indicate corruption or injection of malware into the firmware. A nonce is generated with the subscriber identity module (step 608) and is transmitted to the secure enclave (step 610). The generation of the nonce and the transmittal to the secure enclave may take place after the completion of the measured boot. The shared secret operator assigned symmetric equipment key and the nonce are encrypted with the asymmetric encryption key in the secure enclave to form a verification encryption package (step 612). The verification encryption package is transmitted to the subscriber identity module. In one embodiment, the verification encryption package is only transmitted upon completion of the measured boot by the mobile equipment OS 219. If the measured boot does not measure the same boot code that was executed when sealing the secret, the SSOASK remains sealed in the secure enclave. After the verification encryption package is transmitted to the subscriber identity module 118, the verification encryption package is decrypted with the asymmetric decryption key to release the shared secret operator assigned symmetric equipment key (step 614). The shared secret operator assigned symmetric equipment key is stored in the subscriber identity module (step 616). A cipher key and an integrity key are generated with the subscriber identity module from the shared secret operator assigned symmetric equipment key (step 618) and are stored in the subscriber identity module (step 620). The cipher key and the integrity key are stored such that they are available for transmitting in response to a verification request, such as by a network node 1302. The cipher key and integrity key may be stored in any suitable form and may or may not be further encrypted. In addition, other cryptographic keys may likewise be saved in the subscriber identity module 118 to provide verification responses in combination with the cipher key and the integrity key.

Figure 7:
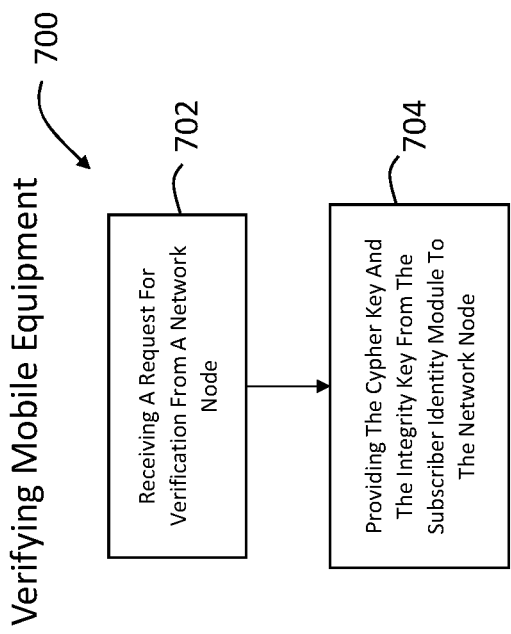
FIG. 7 is a flowchart describing the steps of verifying the mobile equipment according to embodiments of the disclosure.
Figure 13:
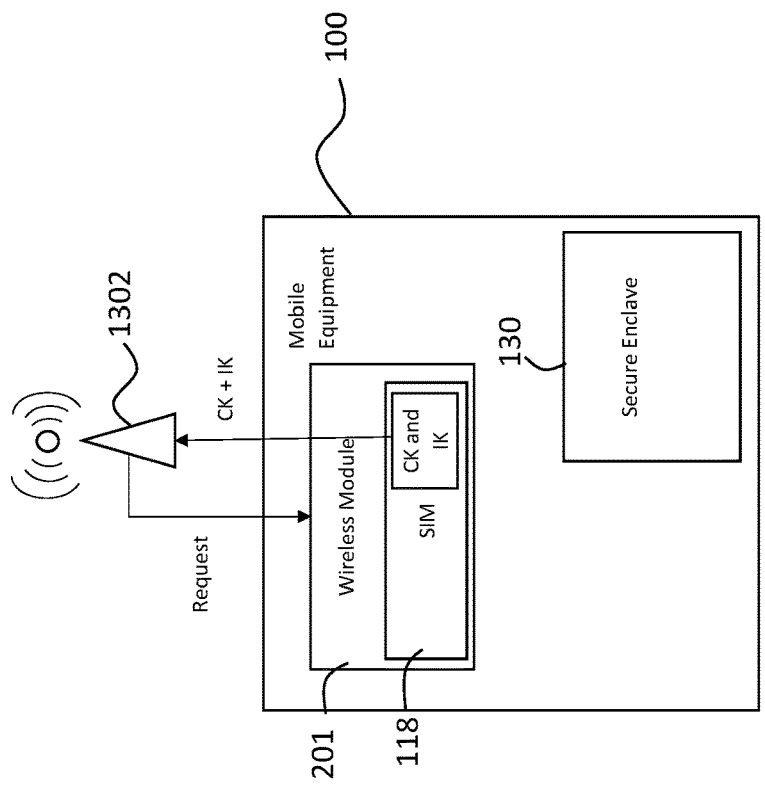
FIG. 13 is a schematic diagram of a verification process between the mobile equipment and the network node according to an embodiment of the disclosure.

FIG. 7 shows details of step 406 of method 400, wherein method 700 includes verifying mobile equipment 100 after the authentication response is received by the network node 1302 (see, for example, FIG. 13). Method 700 includes receiving, with the wireless module, a request for verification from a network node (step 702). In response to the request for verification, providing the cipher key and the integrity key from the subscriber identity module to the network node (step 704). In one embodiment, the cipher key and integrity key provided to the network node are encrypted. In one embodiment, when the cipher key and the integrity key are sent for Authentication, the message contains AUTH(token) & RAND(cryptographic number generated as response). In one embodiment, the method 700 includes permitting access by the mobile equipment 100 to a wireless network associated with the network node 1302 upon verification of the cipher key and the integrity key from the subscriber identity module to the network node by the network node. In one embodiment, the access to the wireless network utilizes a 5G protocol. Likewise, method 700 includes restricting access to the wireless network by the mobile equipment 100 to a wireless network associated with the network node 1302 if verification of the cipher key and the integrity key from the subscriber identity module to the network node is not verified by the network node. Alternatively, the network node 1302 may restrict access to the wireless network, for example access utilizing a non-5G protocol if the authentication response is determined by the network node to not correspond to the unique challenge code and the public certificate of the authentication request. Restricting access to the network may vary depending upon specific operators. For example, operators may choose to tear down the network connectivity, meaning no network access to the device or may proceed with the understanding that extra 5G security is not present and cannot be used.

Figure 8:
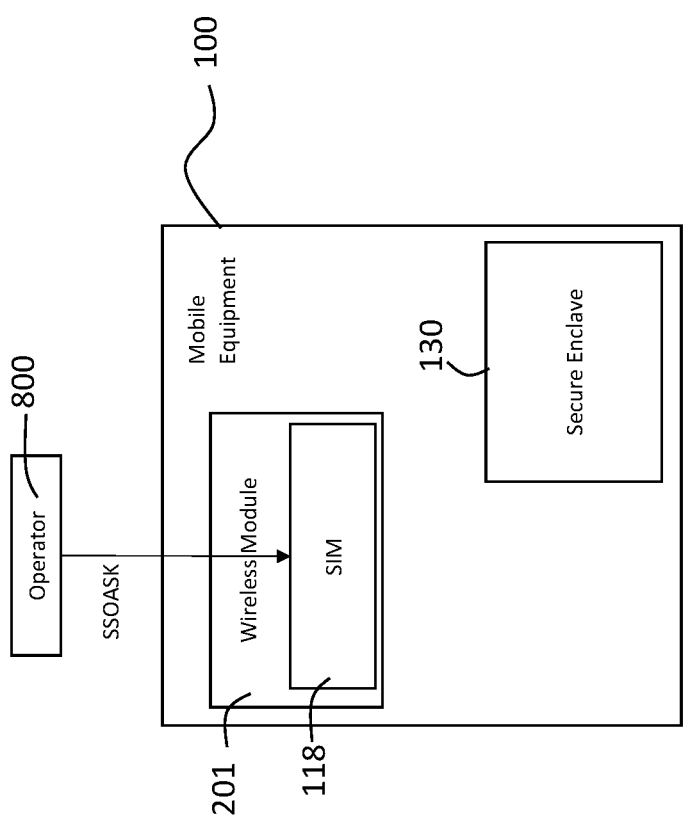
FIG. 8 is a schematic diagram of the provisioning process utilizing the operating components of an illustrative mobile equipment according to an embodiment of the disclosure.

FIGS. 8-13 show a schematic illustration of the components and the operation of module equipment 100 during the method, according to the present disclosure. FIG. 8 illustrates a provisioning method 500 for mobile equipment 100. As shown in FIG. 8, upon request from the subscriber identity module (SIM) 118 of mobile equipment 100, operator 800 remotely generates and communicates, shared secret operator assigned symmetric equipment key to mobile equipment 100. Once the shared secret operator assigned symmetric equipment key has been received the shared secret operator assigned symmetric key is saved in the subscriber identity module (SIM) 118.

Figure 9:
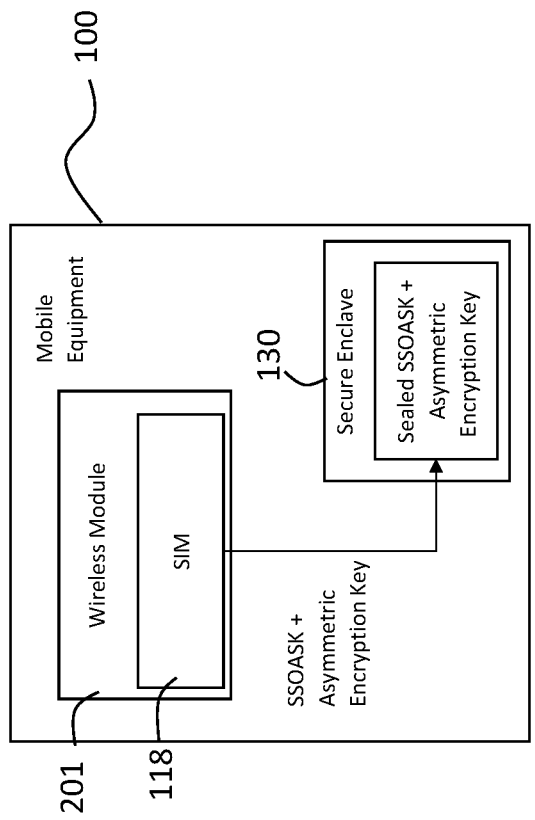
FIG. 9 is a schematic diagram of a portion of the challenging process of an illustrative mobile equipment according to an embodiment of the disclosure.

FIG. 9 shows a portion of the challenging method 600, where the shared secret operator assigned symmetric equipment key and an asymmetric key pair generated by the subscriber identity module 118 are provided to the secure enclave 130, wherein the shared secret operator assigned symmetric equipment key and the asymmetric encryption key are sealed into the secure enclave. As noted above, in one embodiment, this portion of the challenging method 600 may be during a measured boot phase of the startup of mobile equipment 100.

Figure 10:
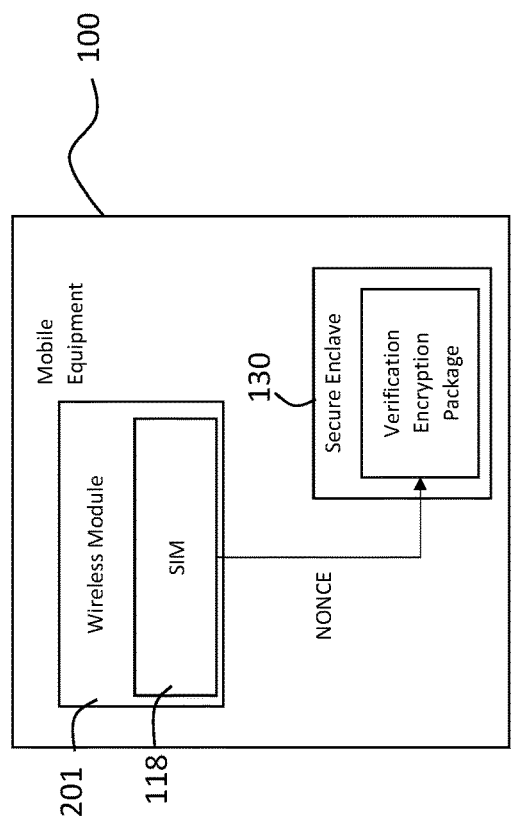
FIG. 10 is a schematic diagram of another portion of the challenging process of an illustrative mobile equipment according to an embodiment of the disclosure.

FIG. 10 shows another portion of the challenging method 600, where a nonce is generated by the subscriber identity module 118 and provided to the secure enclave 130, wherein the nonce is encrypted with the shared secure operator assigned symmetric equipment key and asymmetric encryption key to form a verification encryption package. As noted above, in one embodiment, the verification encryption package is only released and transmitted from the secure enclave 130 if the measured boot phase does not identify any problems or anomalies with the software of the mobile equipment 100.

Figure 11:
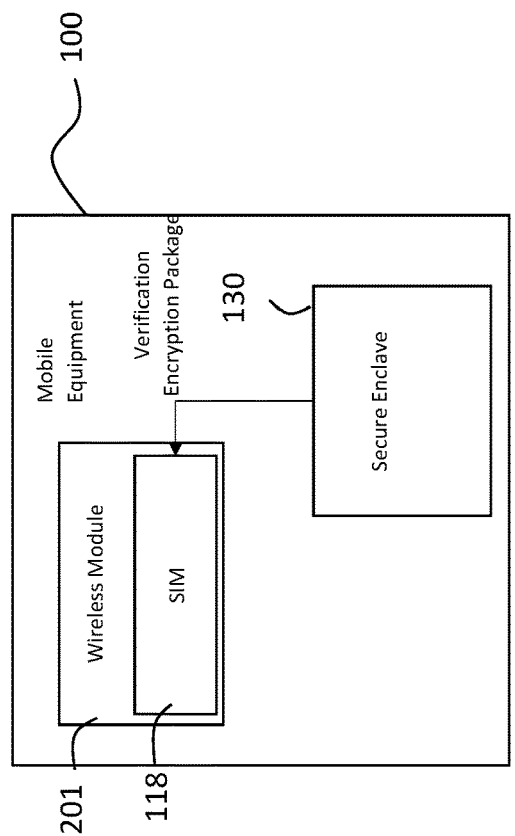
FIG. 11 is a schematic diagram of another portion of the challenging process of an illustrative mobile equipment according to an embodiment of the disclosure.

FIG. 11 shows another portion of the challenging method 600, where the verification encryption package is transmitted to the subscriber identity module 118 (such as after the measured boot) and is decrypted with the asymmetric decryption key. to provide verification responses in combination with the cipher key and the integrity key.

Figure 12:
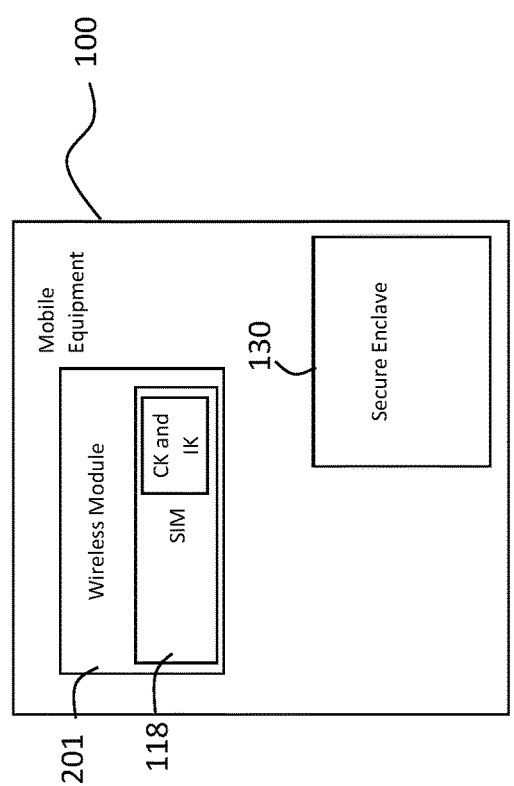
FIG. 12 is a schematic diagram of another portion of the challenging process of an illustrative mobile equipment according to an embodiment of the disclosure.

FIG. 12 shows another portion of the challenging method 600, where the subscriber identity module 118 generated a cipher key (CK) and an integrity (IK), which are saved into the subscriber identity module 118 for later use in verifying the mobile equipment with a network node 1302. The cipher key and the integrity key are stored such that they are available for transmitting in response to a verification request, such as by a network node 1302. The cipher key and integrity key may be stored in any suitable form and may or may not be further encrypted. In addition, other cryptographic keys may likewise be saved in the subscriber identity module 118

FIG. 13 shows a verification method 700 for verifying mobile equipment 100 with network node 1302. As shown in FIG. 13, the method includes, upon receiving a request from network node 1302, transmitting the cipher key (CK) and the integrity key (IK) is provided to the network node 1302. While FIG. 13 show transmitting of the CK and IK, the process according to the present disclosure is not so limited. For example, the CK and IK may be encrypted or may be combined with other security certificates or cryptographic keys in order to provide further verification of identity of the mobile device 100. In one embodiment, the subscriber identity module generates and/or stores the security certificates or cryptographic keys to provide the verification response.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. These components also can execute from various computer readable storage media comprising various data structures stored thereon. The components can communicate via local and/or remote processes such as in accordance with a signal comprising one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of UE. A processor also can be implemented as a combination of computing processing units.

Further, terms like "mobile equipment", "user equipment," "user device," "mobile device," "mobile," station, "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary," where used, is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature can be combined with one or more other features of the other implementations as may be desired and advantageous for any given or particular application. Furthermore, to the extent that the terms "have", "having", "includes" and "including" and variants thereof are used in either the detailed description or the claims, these terms are intended to be inclusive in a manner similar to the term "comprising."

While the exemplary embodiments illustrated in the figures and described herein are presently preferred, it should be understood that these embodiments are offered by way of example only. Accordingly, the present application is not limited to a particular embodiment but extends to various modifications that nevertheless fall within the scope of the appended claims. The order or sequence of any processes or method steps may be varied or re-sequenced according to alternative embodiments.

The invention claimed is:

1. A non-transitory machine-readable storage medium storing one or more sequences of instructions for a secured challenge and response for wireless network security, which when executed by one or more processors, cause:

a mobile equipment to provision the mobile equipment with an operator, the provisioning comprising:
requesting, with a subscriber identity module associated with the mobile equipment, a shared secret operator assigned symmetric equipment key; and
providing, from the operator, the shared secret operator assigned symmetric equipment key, and storing the shared secret operator assigned symmetric equipment key within the subscriber identity module;
the subscriber identity module to challenge the mobile equipment, the challenging comprising:

generating an asymmetric key pair, the asymmetric key pair including an asymmetric encryption key and an asymmetric decryption key;

providing the shared secret operator assigned symmetric equipment key and the asymmetric encryption key to a secure enclave;

sealing the shared secret operator assigned symmetric equipment key and the asymmetric encryption key into the secure enclave;

generating a nonce with the subscriber identity module and transmitting the nonce to the secure enclave;

encrypting the shared secret operator assigned symmetric equipment key and the nonce with the asymmetric encryption key in the secure enclave to form a verification encryption package;

transmitting the verification encryption package to the subscriber identity module;

decrypting the verification encryption package with the asymmetric decryption key to release the shared secret operator assigned symmetric equipment key;

storing the shared secret operator assigned symmetric equipment key in the subscriber identity module;

generating, with the subscriber identity module, a cipher key and an integrity key from the shared secret operator assigned symmetric equipment key; and storing the cipher key and an integrity key in the subscriber identity module.

2. The non-transitory machine-readable storage medium of claim 1, wherein the generating an asymmetric key pair is generating with the subscriber identity module.

3. The non-transitory machine-readable storage medium of claim 2, further comprising one or more sequences of instructions for a secured challenge and response for wireless network security, which when executed by one or more processors, cause:

verification of the mobile equipment, the verification comprising:
receiving, with the wireless module, a request for verification from a network node; and
in response to the request for verification, providing the cipher key and the integrity key from the subscriber identity module to the network node.

4. The non-transitory machine-readable storage medium of claim 3, wherein the cipher key and integrity key provided to the network node are encrypted.

5. The non-transitory machine-readable storage medium of claim 3, further comprising, permitting access by the mobile equipment to a wireless network associated with the network node upon verification of the cipher key and the integrity key from the subscriber identity module to the network node by the network node.

6. The non-transitory machine-readable storage medium of claim 5, wherein the access to the wireless network utilizes a 5G protocol.

7. The non-transitory machine-readable storage medium of claim 3, further comprising, restricting access to the wireless network by the mobile equipment to a wireless network associated with the network node if verification of the cipher key and the integrity key from the subscriber identity module to the network node is not verified by the network node.

8. The non-transitory machine-readable storage medium of claim 3, wherein the mobile equipment radio module includes a 5G radio access network driver.

9. A computer system configured to provide a secured challenge and response for wireless network security, comprising:

a mobile equipment comprising one or more processors, the mobile equipment comprising one or more non-transitory computer-readable storage mediums storing one or more sequences of instructions, which when executed, cause:

a mobile equipment to provision the mobile equipment with an operator, the provisioning comprising:
requesting, with a subscriber identity module associated with the mobile equipment, a shared secret operator assigned symmetric equipment key;
and providing, from the operator, the shared secret operator assigned symmetric equipment key, and storing the shared secret operator assigned symmetric equipment key within the subscriber identity module; the subscriber identity module to challenge the mobile equipment, the challenging comprising: generating an asymmetric key pair, the asymmetric key pair including an asymmetric encryption key and an asymmetric decryption key; providing the shared secret operator assigned symmetric equipment key and the asymmetric encryption key to a secure enclave; sealing the shared secret operator assigned symmetric equipment key and the asymmetric encryption key into the secure enclave; generating a nonce with the subscriber identity module and transmitting the nonce to the secure enclave; encrypting the shared secret operator assigned symmetric equipment key and the nonce with the asymmetric encryption key in the secure enclave to form a verification encryption package; transmitting the verification encryption package to the subscriber identity module; decrypting the verification encryption package with the asymmetric decryption key to release the shared secret operator assigned symmetric equipment key; storing the shared secret operator assigned symmetric equipment key in the subscriber identity module; generating, with the subscriber identity module, a cipher key and an integrity key from the shared secret operator assigned symmetric equipment key; and storing the cipher key and an integrity key in the subscriber identity module.

10. The computer system of claim 9, wherein the generating an asymmetric key pair is generating with the subscriber identity module.

11. The computer system of claim 9, further comprising one or more sequences of instructions for a secured challenge and response for wireless network security, which when executed, cause:

verification of the mobile equipment, the verification comprising:
receiving, with the wireless module, a request for verification from a network node; and
in response to the request for verification, providing the cipher key and the integrity key from the subscriber identity module to the network node.

12. The computer system of claim 11, wherein the cipher key and integrity key provided to the network node are encrypted.

13. The computer system of claim 11, further comprising, permitting access by the mobile equipment to a wireless network associated with the network node upon verification of the cipher key and the integrity key from the subscriber identity module to the network node by the network node.

14. The computer system of claim 13, wherein the access to the wireless network utilizes a 5G protocol.

15. The computer system of claim 12, further comprising, restricting access to the wireless network by the mobile equipment to a wireless network associated with the network node if verification of the cipher key and the integrity key from the subscriber identity module to the network node is not verified by the network node.

16. The computer system of claim 11, wherein the mobile equipment radio module includes a 5G radio access network driver.

17. A method for providing a secured challenge and response for wireless/mobile/IOT network security, comprising:
provisioning a mobile equipment with an operator, the provisioning comprising:
requesting, with a subscriber identity module associated with the mobile equipment, a shared secret operator assigned symmetric equipment key; and
providing, from the operator, the shared secret operator assigned symmetric equipment key, and storing the shared secret operator assigned symmetric equipment key within the subscriber identity module;
challenging the mobile equipment with the subscriber identity module, the challenging comprising:
generating an asymmetric key pair, the asymmetric key pair including an asymmetric encryption key and an asymmetric decryption key;
providing the shared secret operator assigned symmetric equipment key and the asymmetric encryption key to a secure enclave;
sealing the shared secret operator assigned symmetric equipment key and the asymmetric encryption key into the secure enclave;
generating a nonce with the subscriber identity module and transmitting the nonce to the secure enclave;
encrypting the shared secret operator assigned symmetric equipment key and the nonce with the asymmetric encryption key in the secure enclave to form a verification encryption package;
transmitting the verification encryption package to the subscriber identity module;
decrypting the verification encryption package with the asymmetric decryption key to release the shared secret operator assigned symmetric equipment key;
storing the shared secret operator assigned symmetric equipment key in the subscriber identity module;
generating, with the subscriber identity module, a cipher key and an integrity key from the shared secret operator assigned symmetric equipment key; and
storing the cipher key and an integrity key in the subscriber identity module.

18. The method of claim 17, wherein the generating an asymmetric key pair is generating with the subscriber identity module.

19. The method of claim 17, wherein the provisioning further comprises:
verifying the mobile equipment, the verifying comprising:
receiving, with the wireless module, a request for verification from a network node; and
in response to the request for verification, providing the cipher key and the integrity key from the subscriber identity module to the network node.

20. The method of claim 19, wherein the cipher key and integrity key provided to the network node are encrypted.

21. The method of claim 19, further comprising, permitting access by the mobile equipment to a wireless network associated with the network node upon verification of the cipher key and the integrity key from the subscriber identity module to the network node by the network node.

22. The method of claim 21, wherein the access to the wireless network utilizes a 5G protocol.

23. The method of claim 21, further comprising, restricting access to the wireless network by the mobile equipment to a wireless network associated with the network node if verification of the cipher key and the integrity key from the subscriber identity module to the network node is not verified by the network node.

24. The method of claim 21, wherein the mobile equipment radio module includes a 5G radio access network driver.

* * * * *